(12) United States Patent
Chalouhi et al.

(10) Patent No.: US 11,983,229 B2
(45) Date of Patent: *May 14, 2024

(54) SYSTEMS AND METHODS FOR TETHERING DEVICES

(71) Applicant: Rovi Guides, Inc., San Jose, CA (US)

(72) Inventors: Olivier Chalouhi, Mountain View, CA (US); Daren Gill, Concord, MA (US); Sankar Ardhanari, Windham, NH (US); Jordan Leonard Davis, San Jose, CA (US); Christopher Thun, San Francisco, CA (US)

(73) Assignee: Rovi Guides, Inc., San Jose, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/245,697

(22) Filed: Apr. 30, 2021

(65) Prior Publication Data
US 2021/0248200 A1   Aug. 12, 2021

Related U.S. Application Data

(63) Continuation of application No. 16/008,987, filed on Jun. 14, 2018, now Pat. No. 11,023,547, which is a
(Continued)

(51) Int. Cl.
| | |
|---|---|
| *G06F 16/9535* | (2019.01) |
| *G06F 3/04817* | (2022.01) |
| *G06F 3/0482* | (2013.01) |
| *G06F 16/435* | (2019.01) |
| *G06N 5/04* | (2023.01) |

(Continued)

(52) U.S. Cl.
CPC ...... *G06F 16/9535* (2019.01); *G06F 3/04817* (2013.01); *G06F 3/0482* (2013.01); *G06F 16/435* (2019.01); *G06N 5/04* (2013.01); *G06Q 30/00* (2013.01); *G06Q 30/0241* (2013.01); *G06Q 50/01* (2013.01); *H04M 1/72412* (2021.01); *H04M 1/72448* (2021.01); *H04M 1/72469* (2021.01)

(58) Field of Classification Search
CPC ............ G06F 16/9535; G06F 3/04817; G06F 3/0482; G06F 16/435; G06N 5/04; G06Q 30/00; G06Q 30/0241; G06Q 50/01; H04M 1/72412; H04M 1/72448; H04M 1/72469
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |

(Continued)

*Primary Examiner* — Dinh Nguyen
(74) *Attorney, Agent, or Firm* — Haley Guiliano LLP

(57) ABSTRACT

Systems and methods are described herein for controlling mobile devices with user equipment devices. A user equipment device may detect a mobile device is within a predetermined proximity to the user equipment device by establishing a bi-directional communication. The user equipment device may determine an input/output option of the mobile device. The input/output option may be a microphone, a cellular Internet connection, a camera, or any other sensor and/or actuator of the mobile device. The user equipment device may generate for display an icon corresponding to the input/output option of the mobile device.

18 Claims, 5 Drawing Sheets

Related U.S. Application Data continuation of application No. 14/696,011, filed on Apr. 24, 2015, now Pat. No. 10,025,864.

(60) Provisional application No. 62/098,077, filed on Dec. 30, 2014.

(51) Int. Cl.
*G06Q 30/00* (2023.01)
*G06Q 30/0241* (2023.01)
*G06Q 50/00* (2012.01)
*H04M 1/72412* (2021.01)
*H04M 1/72448* (2021.01)
*H04M 1/72469* (2021.01)

(56) References Cited

U.S. PATENT DOCUMENTS

| | | | |
|---|---|---|---|
| 6,564,378 B1 | 5/2003 | Satterfield et al. | |
| 6,756,997 B1 | 6/2004 | Ward et al. | |
| 7,165,098 B1 | 1/2007 | Boyer et al. | |
| 7,529,741 B2 | 5/2009 | Aravamudan et al. | |
| 7,644,075 B2 | 1/2010 | Zeng et al. | |
| 7,761,892 B2 | 7/2010 | Ellis et al. | |
| 8,046,801 B2 | 10/2011 | Ellis et al. | |
| 8,510,247 B1 | 8/2013 | Kane et al. | |
| 8,660,847 B2 | 2/2014 | Soemo et al. | |
| 8,682,725 B2 | 3/2014 | Jain et al. | |
| 8,762,326 B1 | 6/2014 | Zhou et al. | |
| 8,849,958 B2 | 9/2014 | Liebald et al. | |
| 9,026,639 B2 * | 5/2015 | Kelley | H04L 43/16 709/224 |
| 2002/0120933 A1 * | 8/2002 | Knudson | H04N 21/482 725/40 |
| 2002/0174430 A1 | 11/2002 | Ellis et al. | |
| 2003/0110499 A1 | 6/2003 | Knudson et al. | |
| 2005/0090242 A1 | 4/2005 | Kotzin et al. | |
| 2005/0251827 A1 | 11/2005 | Ellis et al. | |
| 2006/0047513 A1 | 3/2006 | Chen | |
| 2008/0005764 A1 | 1/2008 | Arling et al. | |
| 2008/0091722 A1 | 4/2008 | Wendelrup | |
| 2008/0205291 A1 * | 8/2008 | Li | H04L 67/104 370/254 |
| 2009/0023389 A1 | 1/2009 | Paryani | |
| 2009/0100478 A1 | 4/2009 | Craner et al. | |
| 2009/0161027 A1 * | 6/2009 | Hardacker | H04N 21/42224 725/38 |
| 2010/0022230 A1 * | 1/2010 | Shim | H04M 1/72505 455/417 |
| 2010/0153885 A1 | 6/2010 | Yates | |
| 2010/0201891 A1 | 8/2010 | Laroia et al. | |
| 2011/0069940 A1 * | 3/2011 | Shimy | H04N 21/42201 386/296 |
| 2011/0092221 A1 | 4/2011 | Zubas et al. | |
| 2011/0197232 A1 | 8/2011 | Sekiguchi | |
| 2012/0179642 A1 | 7/2012 | Sweeney et al. | |
| 2012/0233640 A1 | 9/2012 | Odryna et al. | |
| 2013/0110823 A1 | 5/2013 | Su et al. | |
| 2013/0159506 A1 | 6/2013 | Stern et al. | |
| 2013/0246432 A1 | 9/2013 | Paskin et al. | |
| 2013/0304818 A1 | 11/2013 | Brumleve et al. | |
| 2014/0025734 A1 | 1/2014 | Griffin | |
| 2014/0106734 A1 | 4/2014 | Lee | |
| 2014/0162625 A1 | 6/2014 | Zhao et al. | |
| 2014/0169795 A1 | 6/2014 | Clough | |
| 2014/0201227 A1 | 7/2014 | Hamilton-Dick et al. | |
| 2014/0229465 A1 | 8/2014 | Rose | |
| 2015/0074131 A1 | 3/2015 | Fernandez | |
| 2015/0121413 A1 | 4/2015 | Ramakrishnan et al. | |
| 2015/0245081 A1 * | 8/2015 | Cook | H04N 21/41407 725/81 |
| 2015/0317398 A1 | 11/2015 | Phillips | |
| 2016/0035347 A1 | 2/2016 | Agarwal et al. | |
| 2016/0037332 A1 | 2/2016 | Egeler et al. | |
| 2016/0092447 A1 | 3/2016 | Venkataraman et al. | |
| 2016/0094889 A1 | 3/2016 | Venkataraman et al. | |

\* cited by examiner

SYSTEMS AND METHODS FOR TETHERING DEVICES

CROSS-REFERENCE TO RELATED APPLICATIONS

This application is a continuation application of U.S. patent application Ser. No. 16/008,987, filed Jun. 14, 2018, which is a continuation application of U.S. patent application Ser. No. 14/696,011 (now U.S. Pat. No. 10,025,864), filed Apr. 24, 2015, which claims priority to U.S. Provisional Application No. 62/098,077, filed Dec. 30, 2014. The disclosures of each application are hereby incorporated by reference herein in their entireties.

BACKGROUND

With the advent of "smart" mobile devices, modern users have become accustomed to interacting with household user equipment in an intuitive and seamless manner. For example, a user may command a smartphone via voice control by interacting with a personal assistant or knowledge navigator, and may like to command other electronic user equipment in a similar way. However, existing user equipment systems such as a television connected to a set-top box have limited hardware support for accepting voice commands or receiving Internet data. Some modifications to these existing user equipment systems may allow an exterior microphone to be connected. However, such modifications tend to be inefficient and often require the users to have extensive technical knowledge.

SUMMARY

Accordingly, systems and methods are described herein for controlling a first device using a second device. More specifically, systems and methods are described herein for extending input/output ("I/O") option functionality from a first device to a second device. For example, a first device may access the voice recognition system of a second device and that that voice recognition system to receive commands from a user.

In some aspects, a user equipment device may detect that a mobile device is within a predetermined proximity. For example, the user equipment device may detect the presence of a user who ordinarily carries the mobile device. In another example, the user equipment device may utilize local or global positioning mechanisms to triangulate the position of the mobile device and compare it with the known position of the user equipment device itself. In yet another example, the user equipment device may detect the mobile device in response to establishing a bi-directional communication between the user equipment device and the mobile device.

The user equipment device may determine an input/output (I/O) option of the mobile device in response to detecting the mobile device, in which the I/O option of the mobile device is associated with a functionality of the mobile device. For example, the microphone I/O option of the mobile device may be associated with a verbal input functionality of the mobile device.

The user equipment device may then generate for display an icon corresponding to the I/O option, in which the icon is selectable to extend a functionality of the user equipment device with the I/O option. For example, in response to determining that a mobile device has a microphone, the user equipment device may generate an on-screen prompt to a user to use the microphone to issue commands to the user equipment device. An individual icon may be generated for display for each I/O option of the mobile device, or a generic icon may be generated for display for all I/O options that exist on the mobile device. Furthermore, the icon may indicate the type, the functionality, the availability, or the accessibility of the I/O option of the mobile device.

The user equipment may then receive a user selection of the icon generated for display that corresponds to the I/O option of the mobile device. In response to receiving the user selection, the user equipment device may communicate data with the selected I/O option, for example, to control the selected I/O option of the mobile device in a master-slave architecture.

In some embodiments, the user device may determine a mobile device offers a plurality of I/O options (e.g., a microphone, a camera, a speaker, a cellular modem, a Bluetooth transceiver, an accelerometer, a gyroscope, or any other sensors or actuators that are available onboard the mobile device) and access one or more of the I/O options. In some embodiments, the I/O option of the mobile device may be determined by extracting a device profile from the mobile device, i.e., without active user input or intervention.

The user equipment may use various techniques to determine I/O options and/or whether or not the options are available to the user equipment device. For example, the user equipment device may determine what I/O options are available on a mobile device and/or whether or not the user equipment device may access these options by requesting information associated with the I/O option from the user (e.g., a type of the I/O option). Alternatively, the user equipment device may query the mobile device without requesting any user input and automatically determine what I/O options are available on a mobile device and/or whether or not the user equipment device may access these options.

It should be noted that the systems and/or methods described above may be applied to, or used in accordance with, other systems, methods and/or pieces of apparatus.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
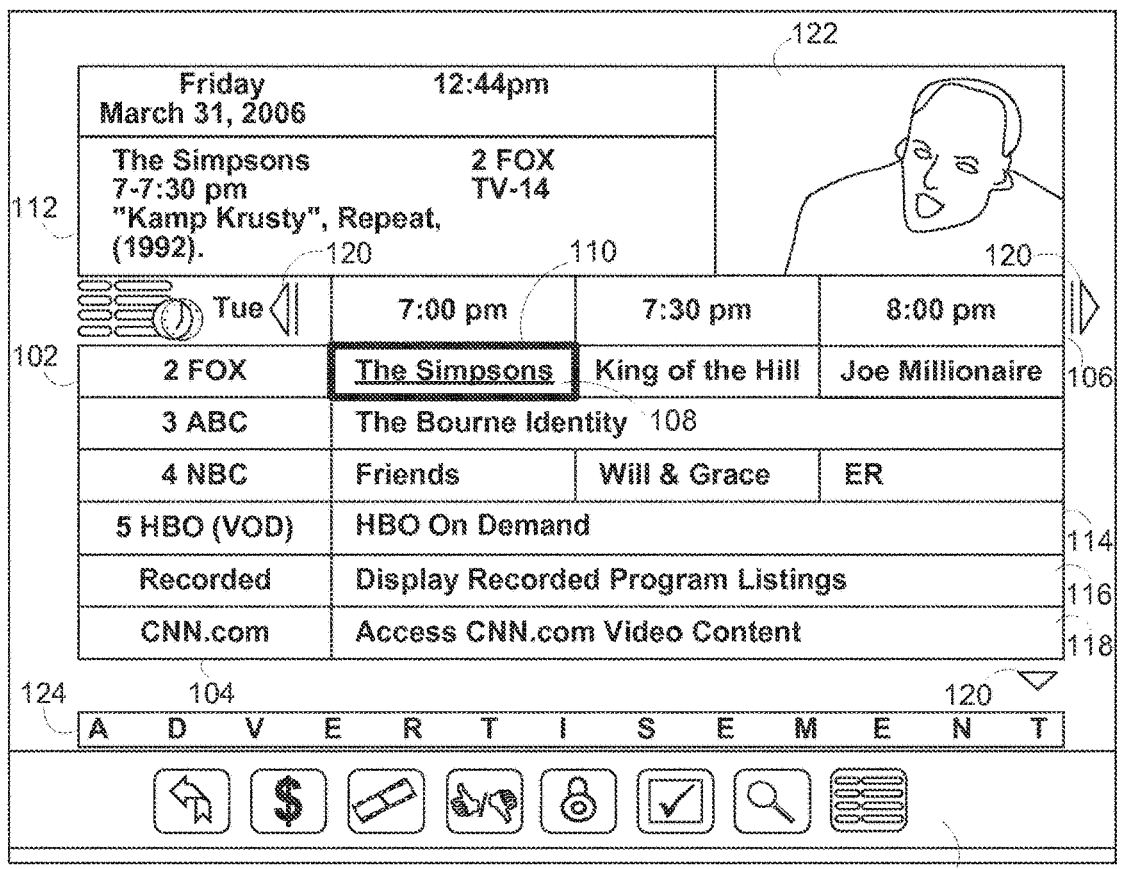
FIG. 1 shows an illustrative example of a display screen for use in accessing media content in accordance with some embodiments of the disclosure.

Systems and methods are described herein for controlling mobile devices using user equipment. It should be noted that references to "mobile device" and "user equipment (device)" are made in the present disclosure for simplicity. The inventive concept and embodiments disclosed herein are applicable to any first device and any second device without departing from the scope of the present disclosure, where the first and second device can be mobile devices, user equipment devices, portable electronic devices, or any other computing devices. A "mobile device" may be any portable or handheld computing devices that host a plurality of input/output functionalities or options. A smartphone, a smart tablet, and a personal digital assistant are all examples of a mobile device as used herein. An "input/output (I/O) option" of a mobile device may be any dedicated input/output, networking, communications, and sensor-actuator modules onboard the mobile device that perform specific functions. These dedicated modules may be implemented in hardware, software, firmware, or any combination thereof. One device being within a "proximity" of another device may refer to a physical or a logical proximity. For example, a mobile device may be physically located near the user equipment to be in the proximity of the user equipment. As another example, the mobile device may be in communication with the user equipment via a direct communication link, rather than by multiple links spanning across switches and routing components. The mobile device in direct communication with the user equipment may be considered to be in logical proximity with the user equipment.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, text documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
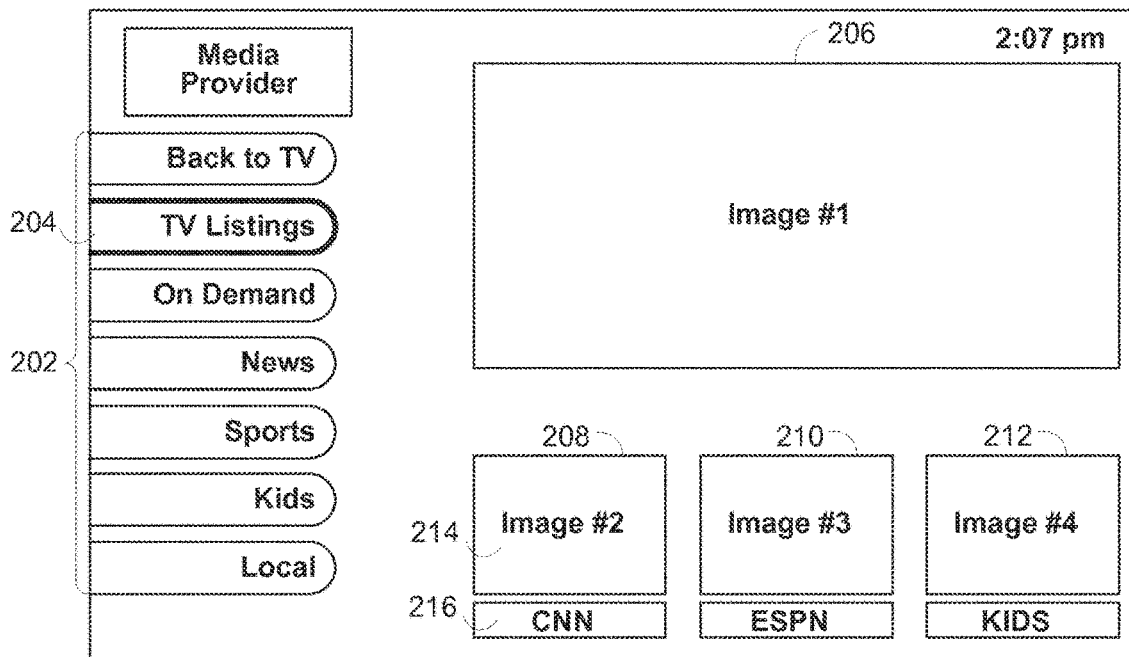
FIG. 2 shows another illustrative example of a display screen used access media content in accordance with some embodiments of the disclosure.

FIGS. 1-2 show illustrative display screens that may be used to provide media guidance data and media assets. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criterion.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criterion. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
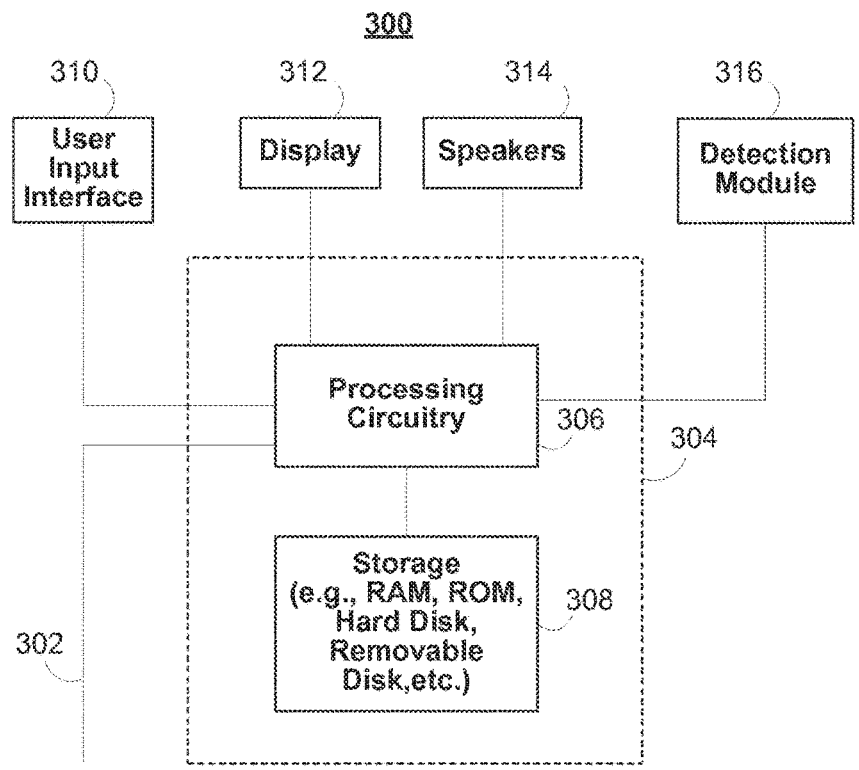
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
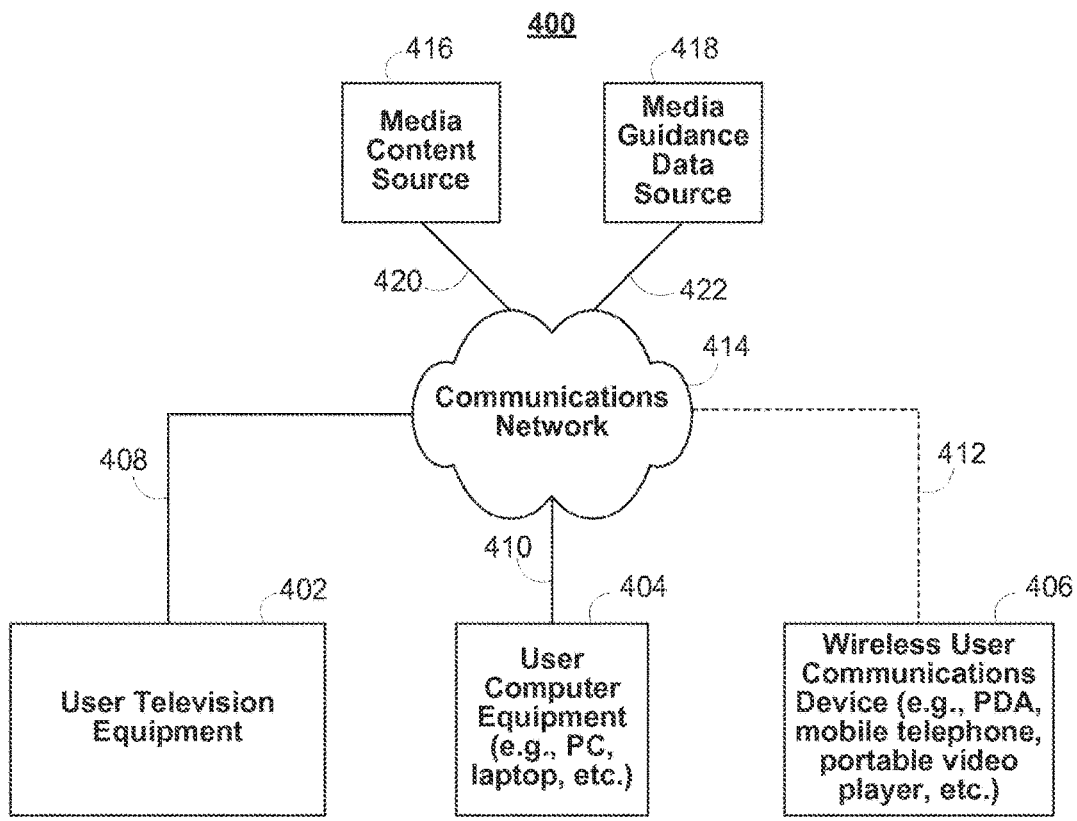
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Nov. 10, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
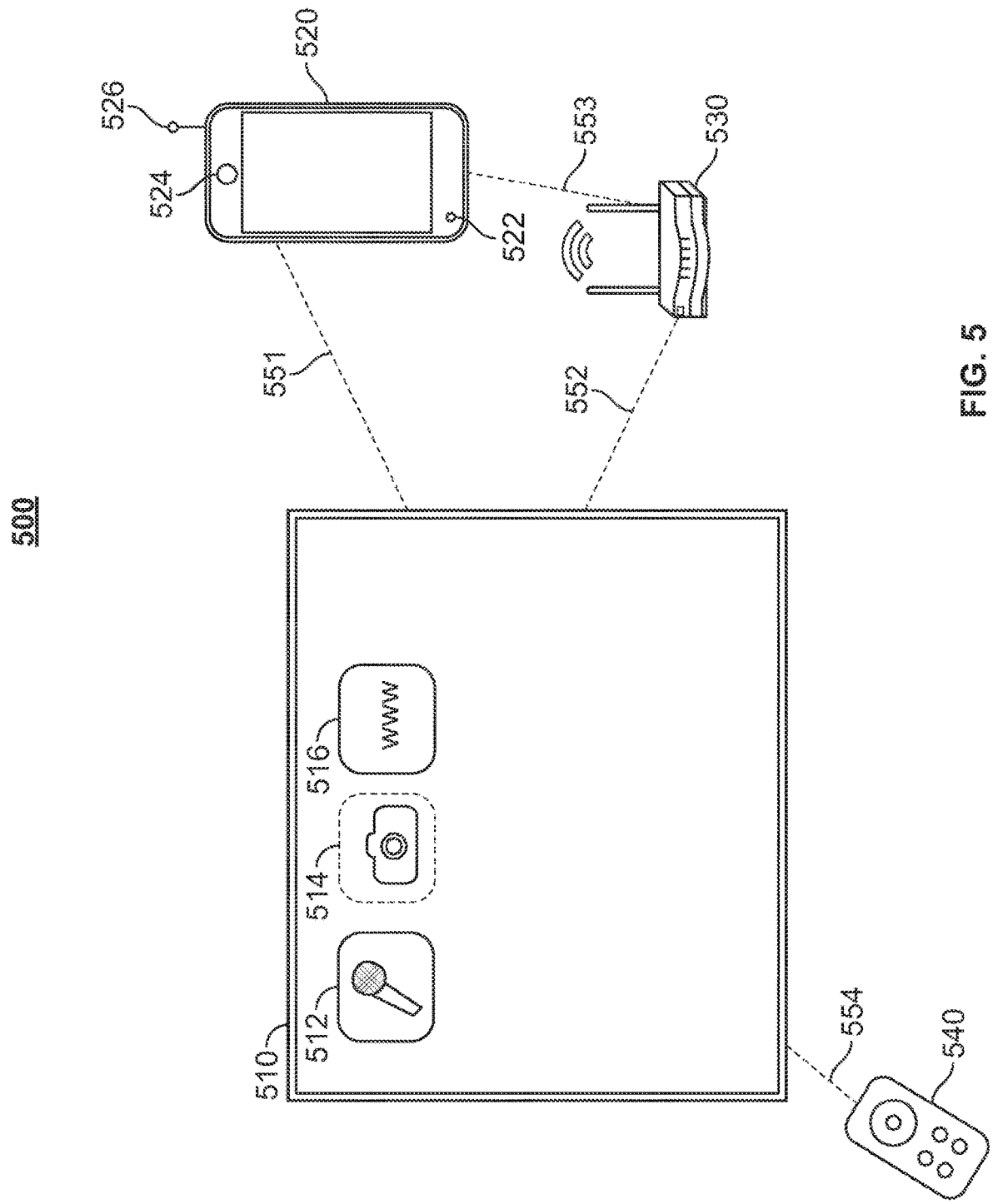
FIG. 5 shows an illustrative system architecture including user equipment and a mobile device in accordance with some embodiments of the disclosure.

FIG. 5 shows an illustrative system architecture including user equipment and a mobile device in accordance with some embodiments of the disclosure. System architecture 500 may include user equipment 510 and mobile device 520. In some embodiments, system architecture 500 may optionally include routing component 530 and remote control 540. User equipment 510 is shown to be a user television equipment, such as user television equipment 402. It is understood that user equipment 510 may be any other types of user equipment as described in relation to FIG. 4, such as user computer equipment 404 and wireless user communications device 406. User equipment 510 may be controlled by a user using remote control 540 via communication link 540, or may be controlled by the user directly. In FIG. 5, user equipment 510 displays icons 512, 514, and 516. Instead of displaying the icons directly, user equipment 510 may alternatively generate these icons for display in another display device.

In some embodiments, user equipment 510 may host a wireless chipset for communicating with routing component 530 using communication link 552. User equipment 510 may also host other hardware, firmware, or software for communicating with other devices using other communication protocols, such as infrared, as described in relation to FIG. 4 and represented by communication link 551 of FIG. 5.

System architecture 500 also includes mobile device 520. Mobile device 520 may host a number of I/O options, such as microphone 522, camera 524, and cellular modem 526. It is understood that mobile device 520 may host additional I/O options not shown in system architecture 500, such as a wireless chipset (under one of IEEE 802.11 standards) for communicating with routing component 530 using communication link 553.

In some embodiments, control circuitry (e.g., control circuitry 304, FIG. 3) may provide the user interface as shown on user equipment 510, which includes icons 512, 514, and 516. The control circuitry 304 may detect that mobile device 520 is within a predetermined proximity within user equipment 510 and establish a bi-directional communication between mobile device 520 and user equipment 510, for example, via communication link 551. The control circuitry 304 may additionally determine an I/O option of the mobile device, such as microphone 522. In response, the control circuitry 304 may generate for display microphone icon 512, corresponding to the determined I/O option (i.e., microphone 522), on user equipment 510. Similarly, the control circuitry 304 may generate for display camera icon 514 and internet icon 516 corresponding to the I/O options camera 522 and cellular modem 524, respectively.

In some embodiments, the control circuitry 304 may generate for display some icons in a different manner than the other icons, based on the type, the functionality, the accessibility, or the availability of the corresponding I/O options of the icons. For example, icon 514 may be generated for display in dotted lines to indicate that camera 524 of mobile device 520 is currently inaccessible or unavailable. Icons 512 and 516 may be generated for display in solid lines to indicate that microphone 522 and cellular modem 526 are accessible or available on mobile device 520. In some embodiments, the icons generated for display may include labels that indicate the type of their corresponding I/O options (not shown in FIG. 5). For example, icon 516 that corresponds to cellular modem 526 may be generated for display with a label indicating that it is a communications I/O option, whereas icon 512 corresponding to microphone 522 may be generated for display with a label indicating that it is an input I/O option. Other manners of differentiating the icons exist, such as graying-out an icon corresponding to an unavailable I/O option of the mobile device, and such other manners of differentiation are well within the scope of the present disclosure.

In some embodiments, the control circuitry 304 may cause user equipment 510 to communicate with mobile device 520 directly via communication link 551. In some other embodiments, the control circuitry 304 may direct user equipment 510 to communicate with mobile device 520 via routing component 530, such that both user equipment 510 and mobile device 520 are connected to a local network established by routing component 530. In a preferred embodiment, if mobile device 520 is directly communicating with user equipment 510 via communication link 551, mobile device 520 is said to be within a logical proximity of user equipment 510, whereas if mobile device is indirectly communicating with user equipment 510 by way of routing component 530, the mobile device is said to be not within a logical proximity of user equipment 510. In another preferred embodiment, if mobile device 520 is physically located within a predetermined radius of the user equipment, the mobile device 520 is said to be within a predetermined physical proximity of the user equipment.

The determination of proximity as described in the above embodiments can be implemented using a threshold function. In some embodiments, the threshold function is predetermined by the user or by system default. When physical proximity is used, the user equipment may set the predetermined radius within which a mobile device is considered to be within a proximity of the user equipment. The predetermined radius is a threshold that can be set by a user of the user equipment. As far as logical proximity is considered, the user equipment may use a maximum number of communication relays, beyond which a mobile device is no longer considered to be within a proximity of the user equipment. The maximum number of communication relays is a threshold that can also be set by the user of the user equipment. In some embodiments, whether a mobile device is within proximity of the user equipment can be determined by considering a combination of physical proximity and logical proximity.

As depicted in FIG. 5, control circuitry 304 may receive user input from remote control 540. For example, a user may enter, using remote control 540, the I/O options that exist on mobile device 520. In some embodiments, a user may also select an icon from icons 512, 514, and 516 using remote control 540. In still some other embodiments, a user may bypass remote control 540 and, instead, make selection or enter information on user equipment 510 using a touch-screen display that displays the associated information.

In response to receiving the user selection of any of the icons 512, 514, and 516, the control circuitry 304 of user equipment may automatically communicate data with the I/O option(s) corresponding to the selected icon(s) (hereinafter the "selected I/O option(s)"). In some embodiments, the user equipment may control the selected I/O option(s) in a master-slave architecture, whereby the control circuitry 304 of the user equipment controls the selected I/O option(s) to extend the functionality of the user equipment. For instance, if microphone icon 512 is selected by the user, the control circuitry 304 of the user equipment may request access to or control the corresponding microphone I/O option 522. In this exemplary manner, the user equipment is able to implement functionalities that require a microphone, such as accepting voice commands from the user.

Upon obtaining control of the selected I/O option(s), the control circuitry 304 of the user equipment may start sending data to and receiving data from the mobile device. In some embodiments, the data received by the control circuitry 304 is processed locally, such as by a locally-implemented dictionary. For example, a user's television equipment may act as a master device to control the microphone of the user's smartphone. When a "volume up" voice command is received by the microphone, the voice command may be relayed to the television equipment and processed locally, e.g., by comparing it against a television-control-command dictionary that includes "volume up", "volume down", "tune to XX channel", etc. In some other embodiments, the data received by the control circuitry 304 is forwarded to a cloud-based server, in accordance with the description of FIG. 4, and processed by the cloud-based server. In the example above, the television equipment may not have a locally-implemented dictionary for voice commands and may choose to forward the "volume up" voice command to a cloud-based server. The cloud-based server may host a larger dictionary for interpreting the received voice command and hence provide more accurate result. In addition, by relying on the cloud-based server to process voice commands, the user equipment is simplified because no local dictionary is needed.

The control circuitry 304 of the user equipment may further translate the processed result to a command and perform the command. Using the same example as above, the television equipment may translate "volume up" to an actual command (e.g., a machine-readable binary code) that controls the volume of the television equipment, and as a result, increases the speaker volume accordingly.

Figure 6:
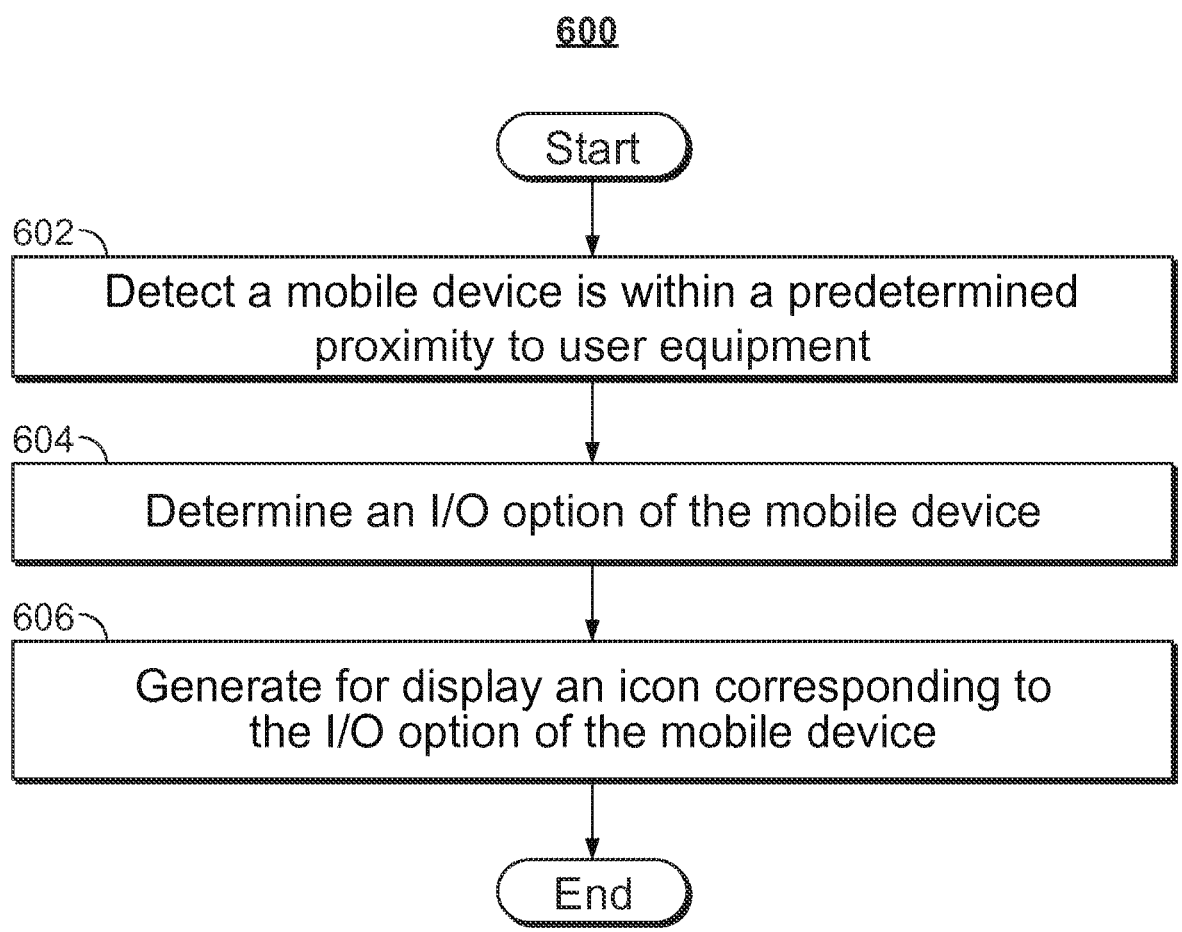
FIG. 6 is a flowchart of illustrative steps for controlling mobile devices with user equipment in accordance with some embodiments of the disclosure.

FIG. 6 is a flowchart of illustrative steps for controlling mobile devices with user equipment in accordance with some embodiments of the disclosure. Flowchart 600 includes detecting that a mobile device is within a predetermined proximity to user equipment at 602, determining an input/output (I/O) option of the mobile device in response to detecting the mobile device at 604, and generating for display an icon corresponding to the I/O option of the mobile device at 606. It should be noted that process 600 or any steps thereof could be performed on, or provided by, any of the devices or combination of devices shown in FIGS. 3 and 4. For example, process 600 may be executed by control circuitry 304 (FIG. 3) as instructed by control circuitry implemented on user equipment 402, 404, and/or 406 (FIG. 4). In addition, one or more steps of process 600 may be incorporated into or combined with one or more steps of any other process or embodiments.

At 602, the control circuitry 304 may detect a mobile device within a predetermined proximity to user equipment. For example, the control circuitry 304 may establish a bi-directional communication with the mobile device in order to detect the mobile device. The detection may be performed by the control circuitry 304 by pinging the mobile device and calculating a response time of the ping. The response time may substantially correspond to the proximity of the mobile device. The control circuitry 304 may also request information on the current location of the mobile device using a local or global positioning system. The current location of the mobile device may then be compared at the control circuitry 304 against known location of the user equipment to deduce a relative proximity between the mobile device an the user equipment. The control circuitry 304 may also use other sensors available on the user equipment, such as an infrared emitter-sensor or a LIDAR to detect its proximity to the mobile device. In some embodiments, the control circuitry 304 may detect the proximity by requesting proximity information from a user.

At 604, the control circuitry 304 determines an I/O option of the mobile device in response to detecting the mobile device at 602. The I/O option may be determined by extracting a device profile from the mobile device via the established bi-directional communication. In some embodiments, the control circuitry 304 may determine the I/O option by requesting information from a user associated with the mobile device. For example, the user may complete a survey on the user equipment while setting up the user equipment to detect and access the mobile device. The survey may include information on the I/O options that exist on the mobile device. In some embodiments, the control circuitry 304 may also determine whether the existing I/O options on the mobile device are accessible or available. The control circuitry 304 may determine that an I/O option is accessible by pinging the I/O option. If a response is received, the I/O option is determined to be accessible. The control circuitry 304 may also determine whether the I/O option is available by requesting the mobile device to provide information on the current operating status of the I/O option. If the I/O option is currently idle, the control circuitry 304 may determine that the I/O option is available. Conversely, if the I/O option is busy, the control circuitry 304 may determine that the I/O option is unavailable.

At 606, the control circuitry 304 may generate for display an icon corresponding to the I/O option. In some embodiments, an icon may be displayed to represent each I/O option that exist on the mobile device. In some other embodiments, a generic icon may be displayed to represent all I/O options on the mobile device. The generic icon may be selectable to produce a sub-menu that enumerates specific I/O options that exist on the mobile device. In some embodiments, the icons may be displayed to indicate accessibility and/or availability of the I/O options. For instance, an icon may be colored, shaded, represented in a different font or font size, or displayed in any other distinguishable manner to indicate that the corresponding I/O option of the icon is unavailable or inaccessible.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
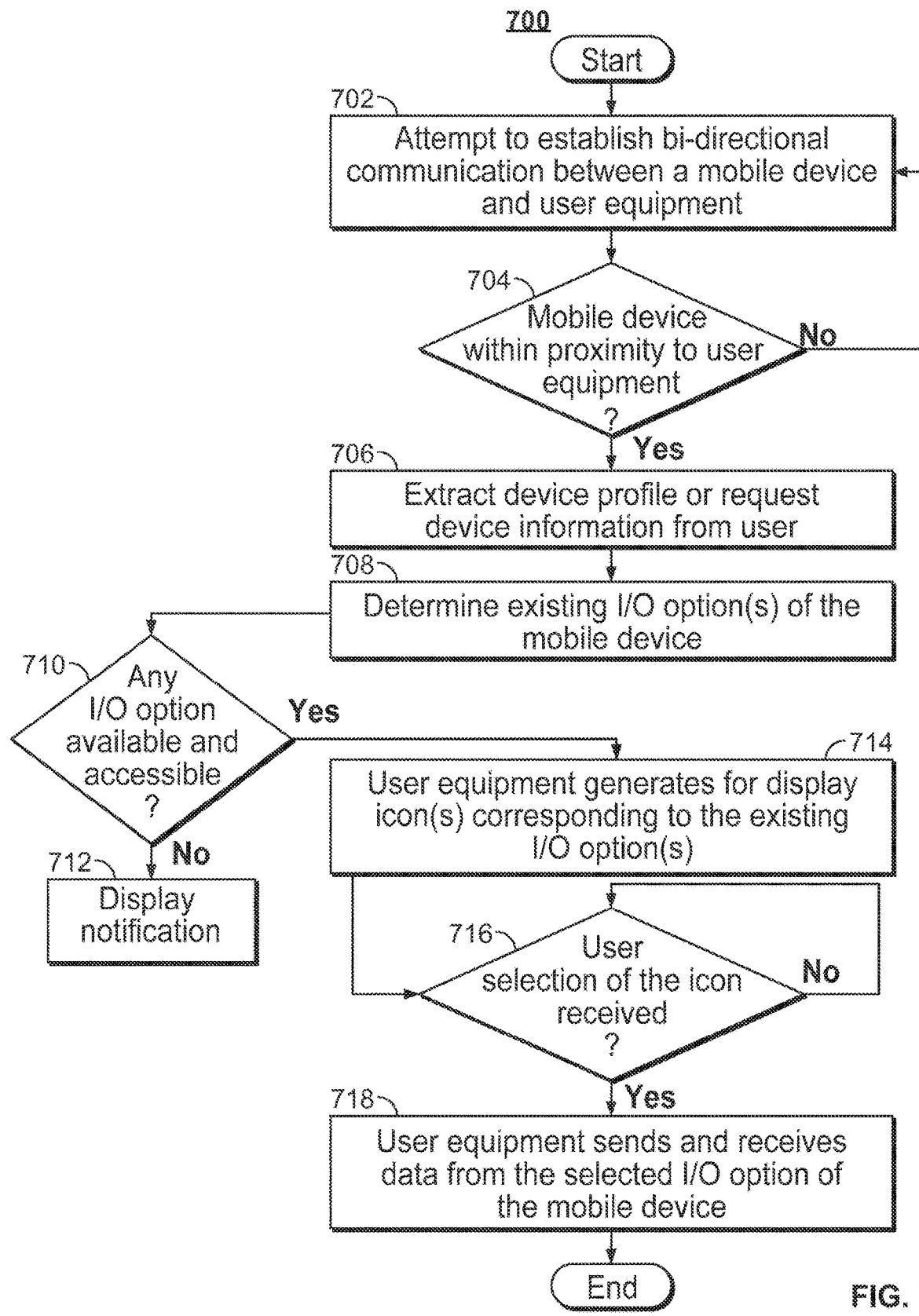
FIG. 7 is another flowchart of illustrative steps for controlling mobile devices with user equipment in accordance with some embodiments of the disclosure.

FIG. 7 depicts flowchart of illustrative steps for controlling mobile devices with user equipment in accordance with some embodiments of the disclosure. Flowchart 700 includes attempting to establish a bi-directional communication between a mobile device and user equipment at 702, determining whether a mobile device is within a predetermined proximity to the user equipment at 704, extracting device profile or requesting device information from a user at 706, determining I/O option(s) that exist on the mobile device at 708, determining whether any I/O option is available and accessible at 710, displaying a notification in response to determining that no I/O option is available and accessible at 712, generating for display icon(s) corresponding to the existing I/O option(s) at 714, receiving user selection at 716, and communicating data to and from the selected I/O option of the mobile device at 718. It should be noted that process 700 or any step thereof could be performed on, or provided by, any of the devices or combination of devices shown in FIGS. 3 and 4. For example, process 700 may be executed by control circuitry 304 (FIG. 3) as instructed by control circuitry 304 implemented on user equipment 402, 404, and/or 406 (FIG. 4). In addition, one or more steps of process 700 may be incorporated into or combined with one or more steps of any other process or embodiments.

At 702, the control circuitry 304 may attempt to establish bi-directional communication between a mobile device and user equipment. As discussed above, the bi-directional communication may be used by the user equipment to ping the mobile device, extract device profile from the mobile device, and request other information from the mobile device.

At 704, the control circuitry 304 may determine whether a mobile device is within a proximity to the user equipment. As discussed before, the proximity to the user equipment may be physical or logical proximity. In some embodiments, the determination is based on the above-described bi-directional communication between the user equipment and the mobile device. The determination may be based on a threshold. For example, the mobile device may be determined to be in proximity with the user equipment if the mobile device is within a threshold physical distance from the user equipment, or if the mobile device is within a threshold number of communication relays to be within a logical proximity of the user equipment. If a particular mobile device is determined not to be in proximity with the user equipment, the control circuitry 304 may attempt to establish other bi-directional communication with other mobile devices, at 702.

However, if a mobile device is determined to be within proximity, the control circuitry may extract device profile from the mobile device or request device information from a user at 706. The device profile may be extracted using the established bi-directional communication, or a local network established by a routing component, such as routing component 530 as depicted in FIG. 5.

At 708, the control circuitry 304 may determine a list of existing I/O option(s) of the mobile device in response to determining that the mobile device is within a predetermined proximity. The list of existing I/O option(s) may be provided by a user of the mobile device and saved onto storage of the user equipment, such as storage 308. In some embodiments, the list of existing I/O option(s) is obtained from the extracted device profile.

At 710, the control circuitry 304 determines whether any I/O option is available and accessible from the list of existing I/O option(s). In response to determining that no I/O option is available or accessible, the control circuitry 304 may generate for display a notification to the user indicating that none of the I/O options is available or accessible, at 712. The notification may be generated for display as a pop-up window, a dialog box, an icon, or any other suitable format. In some embodiments, the entire list of existing I/O option(s) on the mobile device may be generated for display on the user equipment, with any available and/or accessible I/O option(s) displayed differently from the I/O option(s) that are not available and/or accessible, at 714.

At 716, the control circuitry 304 receives a user selection of an icon corresponding to an I/O option. If no user selection is received, the control circuitry 304 continues to wait for a user selection. In some embodiments, the control circuitry 304 waits for a user selection of an icon until a time-out threshold is reached. If a user selection is received, the control circuitry 304 begins data communication with the I/O option corresponding to the selected icon. In some embodiments, the data communication may take place in a master-slave architecture. In some embodiments, the data communication may involve data processing either locally on the user equipment or on a cloud-based server, as described above in relation to FIG. 5.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, updating links between keywords associated with a trending topic may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the strength of association between keywords as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   establishing, using a first device, bi-directional communication with a second device;
   determining a control option available on the second device is not available on the first device, wherein determining the control option is available on the second device comprises:
     determining a command language of the control option;
     comparing the command language to a communication protocol of the first device;
     determining, based on the comparing, the command language corresponds to the communication protocol of the first device; and
     in response to the determining, identifying the control option as a source for inputs for operations at the first device;
   generating a selectable option on the first device, wherein the selectable option enables the first device to receive commands from the control option on the second device;
   receiving a selection of the selectable option;
   receiving an input at the second device corresponding to the control option; and
   in response to receiving the input at the second device corresponding to the control option, performing an operation at the first device that corresponds to the control option.

2. The method of claim 1, further comprising:
   detecting, at the first device, the second device is within a predetermined proximity of the first device; and
   determining the second device has a communication protocol compatible with the first device.

3. The method of claim 2, wherein detecting, at the first device, the second device is within the predetermined proximity of the first device comprises determining the second device is within a logical proximity of the first device.

4. The method of claim 2, wherein detecting, at the first device, the second device is within the predetermined proximity of the first device comprises determining the second device is within a maximum distance of the first device.

5. The method of claim 1, wherein establishing, using the first device, the bi-directional communication with the second device comprises:
   generating a local communication stream between the first device and the second device, wherein the local communication stream comprises a bandwidth capable of supporting an exchange of device information between the first device and the second device.

6. The method of claim 1, wherein the control option comprises an I/O option.

7. The method of claim 6, further comprising generating for display at the first device an icon corresponding to the I/O option, wherein the icon is selectable to extend a functionality to the first device otherwise unavailable without the second device.

8. The method of claim 7, wherein the icon indicates a type of the I/O option.

9. The method of claim 1, wherein determining the control option available on the second device is not available on the first device further comprises requesting information from a user through an interface to confirm the control option of the second device and the lack of the control option on the first device.

10. A system comprising:
    a communication port;
    a memory storing instructions; and
    control circuitry communicably coupled to the memory and the communication port and configured to execute the instructions to:
      establish, using a first device, bi-directional communication with a second device;
      determine a control option available on the second device is not available on the first device, wherein the control circuitry is configured to determine that the control option is available on the second device by:
        determining a command language of the control option;
        comparing the command language to a communication protocol of the first device:
        determining, based on the comparing, the command language corresponds to the communication protocol of the first device; and in response to the determining, identifying the control option as a source for inputs for operations at the first device;

generate a selectable option on the first device, wherein the selectable option enables the first device to receive commands from the control option on the second device;

receive a selection of the selectable option;

receive an input at the second device corresponding to the control option; and in response to receiving the input at the second device corresponding to the control option, perform an operation at the first device that corresponds to the control option.

11. The system of claim 10, wherein the control circuitry is further configured to:

detect, at the first device, the second device is within a predetermined proximity of the first device; and determine the second device has a communication protocol compatible with the first device.

12. The system of claim 11, wherein the control circuitry is configured to detect, at the first device, the second device is within the predetermined proximity of the first device by determining the second device is within a logical proximity of the first device.

13. The system of claim 11, wherein the control circuitry is configured to detect, at the first device, the second device is within the predetermined proximity of the first device by determining the second device is within a maximum distance of the first device.

14. The system of claim 10, wherein the control circuitry configured to establish, using the first device, the bi-directional communication with the second device is further configured to:

generate a local communication stream between the first device and the second device, wherein the local communication stream comprises a bandwidth capable of supporting an exchange of device information between the first device and the second device.

15. The system of claim 10, wherein the control circuitry is further configured to determine the control option comprises an I/O option.

16. The system of claim 15, wherein the control circuitry is further configured to generate for display at the first device an icon corresponding to the I/O option, wherein the icon is selectable to extend a functionality to the first device otherwise unavailable without the second device.

17. The system of claim 16, wherein the control circuitry is configured to generate the icon such that the icon indicates a type of the I/O option.

18. The system of claim 10, wherein the control circuitry configured to determine the control option available on the second device is not available on the first device is further configured to request information from a user through an interface to confirm the control option of the second device and the lack of the control option on the first device.

\* \* \* \* \*